(12) United States Patent
Kim (10) Patent No.: US 10,576,844 B2
(45) Date of Patent: Mar. 3, 2020

(54) BATTERY MANAGEMENT APPARATUS, AND BATTERY PACK AND VEHICLE INCLUDING THE SAME

(71) Applicant: LG Chem, Ltd., Seoul (KR)

(72) Inventor: Won-Gon Kim, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 16/166,555

(22) Filed: Oct. 22, 2018

(65) Prior Publication Data
US 2019/0135128 A1 May 9, 2019

(30) Foreign Application Priority Data
Nov. 3, 2017 (KR) .......................... 10-2017-0146220

(51) Int. Cl.
*H02J 7/00* (2006.01)
*H02J 7/14* (2006.01)
(Continued)

(52) U.S. Cl.
CPC .............. *B60L 58/22* (2019.02); *B60K 11/06* (2013.01); *B60L 3/0046* (2013.01); *B60L 58/26* (2019.02); *H01M 10/441* (2013.01); *H01M 10/613* (2015.04); *H02J 7/0021* (2013.01); *H02J 7/0024* (2013.01); *H02J 7/0026* (2013.01); *B60L 2240/545* (2013.01)

(58) Field of Classification Search
USPC ....... 320/121, 127, 128, 134, 137, 116, 117, 320/118, 119, 120
See application file for complete search history.

(56) References Cited

U.S. PATENT DOCUMENTS

2006/0103351 A1* 5/2006 Tanigawa .............. H02J 7/0016 320/118
2010/0134068 A1* 6/2010 Lim ...................... H02J 7/0016 320/116
(Continued)

FOREIGN PATENT DOCUMENTS

JP 2014203609 A 10/2014
KR 20100062200 A * 6/2010 ............ H02J 7/0016
(Continued)

*Primary Examiner* — Alexis B Pacheco
(74) *Attorney, Agent, or Firm* — Lerner, David, Littenberg, Krumholz & Mentlik, LLP (57) ABSTRACT

Disclosed is a battery management apparatus, which includes: a plurality of first power paths configured to electrically connect a plurality of battery modules and a balancing resistor; a plurality of first switching units configured to electrically connect or disconnect the plurality of first power paths; a plurality of second power paths configured to electrically connect the plurality of battery modules to a fan for cooling a substrate at which the balancing resistor is mounted; a plurality of second switching units configured to electrically connect or disconnect the plurality of second power paths; a residual capacity calculating unit configured to calculate a residual capacity of each of the plurality of battery modules; a determining unit configured to determine a battery module to be balanced among the plurality of battery modules based on the residual capacity; and a control unit configured to control the plurality of first switching units.

10 Claims, 5 Drawing Sheets

(51) Int. Cl.
*B60L 58/22* (2019.01)
*B60L 3/00* (2019.01)
*B60K 11/06* (2006.01)
*H01M 10/613* (2014.01)
*H01M 10/44* (2006.01)
*B60L 58/26* (2019.01)

(56) References Cited

U.S. PATENT DOCUMENTS

| | | | | |
|---|---|---|---|---|
| 2010/0134069 | A1* | 6/2010 | Oosawa | H02J 7/0021 320/118 |
| 2010/0237829 | A1* | 9/2010 | Tatebayashi | H01M 4/661 320/118 |
| 2011/0074354 | A1* | 3/2011 | Yang | H01M 10/441 320/116 |
| 2012/0025769 | A1* | 2/2012 | Kikuchi | B60L 3/0046 320/118 |
| 2012/0086399 | A1* | 4/2012 | Choi | H02J 7/0016 320/116 |
| 2012/0104856 | A1 | 5/2012 | Gottlieb et al. | |
| 2012/0139491 | A1* | 6/2012 | Eberhard | H02J 7/0016 320/118 |
| 2012/0161707 | A1* | 6/2012 | Kim | H02J 7/0016 320/118 |
| 2013/0069594 | A1* | 3/2013 | Jung | H01M 10/425 320/112 |
| 2013/0099746 | A1* | 4/2013 | Nork | B60L 11/1866 320/118 |
| 2013/0257377 | A1* | 10/2013 | Diamond | G01R 31/3835 320/118 |
| 2014/0327400 | A1* | 11/2014 | Kudo | H02J 7/0016 320/118 |

FOREIGN PATENT DOCUMENTS

| | | | | |
|---|---|---|---|---|
| KR | 20120074848 A | * | 7/2012 | H02J 7/0016 |
| KR | 20140064097 A | * | 5/2014 | H02J 7/04 |
| KR | 20140075078 A | | 6/2014 | |
| KR | 20150144609 A | | 12/2015 | |
| KR | 20160007739 A | | 1/2016 | |
| KR | 20160014167 A | | 2/2016 | |

* cited by examiner

FIG. 8

BATTERY MANAGEMENT APPARATUS, AND BATTERY PACK AND VEHICLE INCLUDING THE SAME

TECHNICAL FIELD

The present application claims priority to Korean Patent Application No. 10-2017-0146220 filed on Nov. 3, 2017 in the Republic of Korea, the disclosures of which are incorporated herein by reference.

The present disclosure relates to a battery management apparatus, and a battery pack and a vehicle including the same, and more particularly, to a battery management apparatus for balancing residual capacities of a plurality of battery modules by using a fan, and a battery pack and a vehicle including the same.

BACKGROUND ART

Recently, due to the depletion of fossil energy and environmental pollution, there is a growing interest in electric products that may be driven using electric energy without using fossil energy.

Accordingly, as the technology of mobile devices, electric vehicles, hybrid vehicles, power storage devices and uninterruptible power supplies has been developed and the demand therefor is increasing, the demand for secondary batteries as energy sources is rapidly increasing in more diverse fields. Thus, secondary batteries are being actively studied in order to meet various demands.

In general, secondary batteries include a nickel cadmium battery, a nickel hydrogen battery, a lithium ion battery, a lithium ion polymer battery and the like. The secondary batteries are classified into lithium-based batteries and nickel hydrogen-based batteries. The lithium-based batteries are mainly applied to small-sized products such as digital cameras, P-DVD, MP3P, mobile phones, PDA, portable game devices, power tools, and e-bikes, and the nickel hydrogen-based batteries are applied to and used for large-sized products such as electric vehicles and hybrid electric vehicles, which demand high output.

Meanwhile, an electric vehicle or a hybrid electric vehicle should drive an electric motor requiring high output power in order to run. Also, a power storage device for supplying power to a building or a certain area needs to supply enough power to meet the power demand. In order to provide such a high-output or large-capacity power, a plurality of batteries configured as a unit module assembly are connected in series or in parallel so that a desired output or power is supplied.

However, when a battery in which a plurality of unit modules are connected is repeatedly charged and discharged, the unit modules have different residual capacities. When the battery is continuously discharged in a state where the residual capacities are unbalanced, a specific unit module with a low residual capacity is overdischarged and thus it is difficult for the battery to stably operate. On the contrary, when the battery is continuously charged in a state where the residual capacities are unbalanced, a specific unit module with a high residual capacity is overcharged to impair the safety of the battery. The imbalance of the residual capacity may cause some unit modules to be overcharged or overdischarged, and due to this problem, the power may not be stably supplied to a load (e.g., an electric motor or a power network).

In order to solve the above problem, various types of circuits are required to continuously monitor the residual capacity of the battery module and balance the residual capacity of each battery module to a certain level.

DISCLOSURE

Technical Problem

The present disclosure is directed to providing a battery management apparatus, which may control a plurality of first switching units to supply a power of a battery module to be balanced to a balancing resistor when the battery module to be balanced is determined, and control a plurality of second switching units according to a substrate temperature of the substrate so that the power of the battery module to be balanced is supplied to the fan, so that the heat generated by balancing using the balancing resistor is cooled to protect components included in the battery management apparatus against overheating, and also providing a battery pack and a vehicle including the same.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery management apparatus, comprising: a plurality of first power paths configured to electrically connect a plurality of battery modules and a balancing resistor; a plurality of first switching units configured to electrically connect or disconnect the plurality of first power paths; a plurality of second power paths configured to electrically connect the plurality of battery modules to a fan for cooling a substrate at which the balancing resistor is mounted; a plurality of second switching units configured to electrically connect or disconnect the plurality of second power paths; a residual capacity calculating unit configured to calculate a residual capacity of each of the plurality of battery modules; a determining unit configured to determine a battery module to be balanced among the plurality of battery modules based on the residual capacity; and a control unit configured to control the plurality of first switching units so that a power of the battery module to be balanced is supplied to the balancing resistor, when the battery module to be balanced is determined, and to control the plurality of second switching units according to a substrate temperature of the substrate so that the power of the battery module to be balanced is supplied to the fan.

Preferably, the determining unit may check whether a capacity deviation between the residual capacities of the plurality of battery modules is equal to or greater than a preset first reference deviation, and determine a battery module with the greatest residual capacity as the battery module to be balanced when the capacity deviation is equal to or greater than the preset first reference deviation as a result of the checking.

Preferably, when the battery module to be balanced is determined, the control unit may check whether the substrate temperature is equal to or higher than a preset reference temperature, and control the plurality of second switching units so that the power of the battery module to be balanced is supplied to the fan when the substrate temperature is equal to or higher than the preset reference temperature as a result of the checking.

Preferably, when the residual capacity of the battery module to be balanced reaches a target capacity, the control unit may interrupt the power of the battery module to be balanced.

Preferably, when the residual capacity of the battery module to be balanced is included in a preset capacity region based on the target capacity, the control unit may control the plurality of first switching units so that the power of the battery module to be balanced is not supplied to the balancing resistor and control the plurality of second switching units so that the power of the battery module to be balanced keeps supplied to the fan that cools the substrate.

Preferably, when a capacity deviation between the residual capacities of the plurality of battery modules is smaller than a preset second reference deviation, the control unit may control the plurality of first switching units so that the power of the battery module to be balanced is not supplied to the balancing resistor and control the plurality of second switching units so that the power of the battery module to be balanced keeps supplied to the fan that cools the substrate.

Preferably, the battery management apparatus may further comprise a plurality of third power paths configured to electrically connect the fan and an external power source; and a plurality of third switching units configured to electrically connect or disconnect the plurality of third power paths.

Preferably, the control unit may control the plurality of third switching units so that a power of the external power source is supplied to the fan when the battery module to be balanced is not determined.

A battery pack according to the present disclosure may include the battery management apparatus.

A vehicle according to the present disclosure may include the battery management apparatus.

Advantageous Effects

According to the present disclosure, when a battery module to be balanced is determined, a plurality of first switching units is controlled to supply a power of the battery module to be balanced to a balancing resistor, and a plurality of second switching units is controlled according to a substrate temperature of a substrate to supply the power of the battery module to be balanced to the fan, so that the heat generated by balancing using the balancing resistor is cooled, thereby protecting components included in the battery management apparatus against overheating.

BEST MODE

The above objects, features and advantages will be described in detail below with reference to the accompanying drawings, so that those skilled in the art to which the present disclosure belongs can easily implement the technical idea of the present disclosure. In the explanations of the present disclosure, if it is deemed that any specific explanation of the related technology can unnecessarily obscure the gist of the present disclosure, the detailed explanation may be omitted. Hereinafter, a preferred embodiment according to the present disclosure will be described in detail with reference to the accompanying drawings. In the drawings, the same reference numerals are used to indicate the same or similar components.

Figure 1:
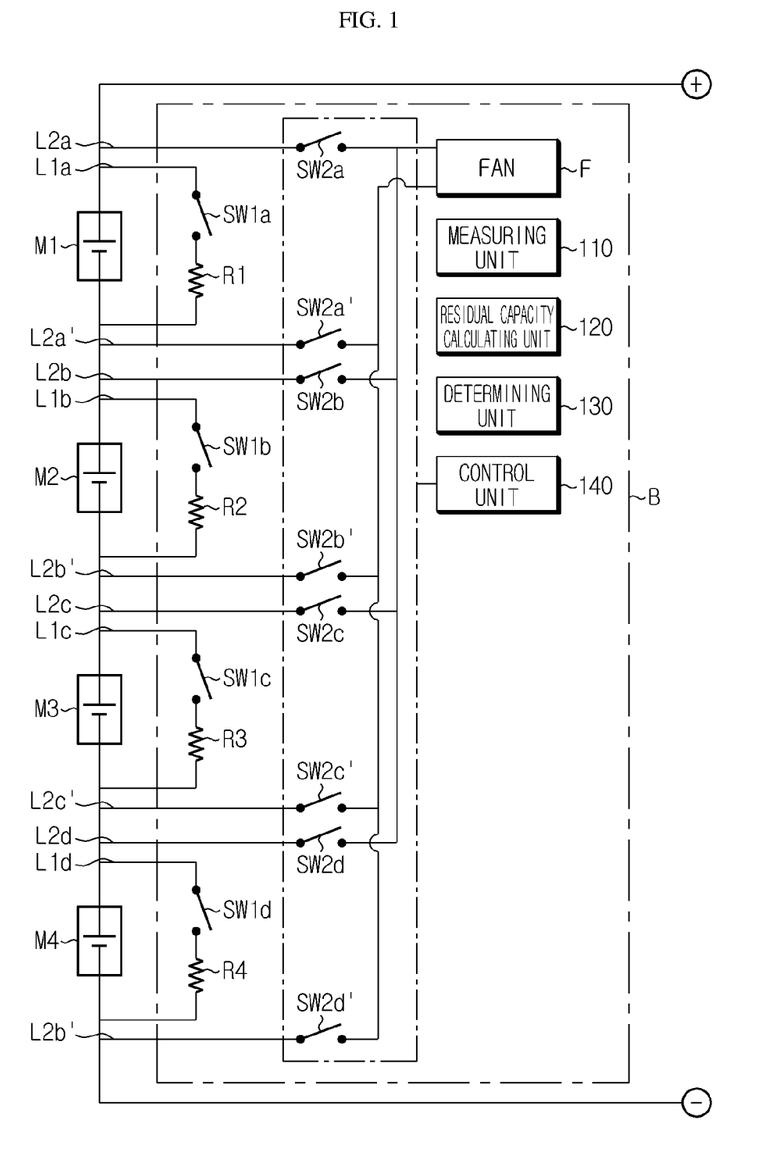
FIG. 1 is a circuit diagram schematically showing a battery management apparatus according to an embodiment of the present disclosure, and a configuration and circuit of a battery pack including the same.

FIG. 1 is a circuit diagram schematically showing a battery management apparatus according to an embodiment of the present disclosure, and a configuration and circuit of a battery pack including the same.

Referring to FIG. 1, a battery management apparatus according to an embodiment of the present disclosure may be included in a battery pack having a plurality of battery modules M1, . . . , M4 and perform balancing between residual capacities of a plurality of battery modules M1, . . . , M4.

For this purpose, the battery management apparatus according to an embodiment of the present disclosure may include a plurality of balancing resistors R1, . . . , R4, a plurality of first power paths L1a, . . . , L1d, a plurality of first switching units SW1a, . . . , SW1d, a fan F, a plurality of second power paths L2a, L2a', . . . , L2d, L2d', a plurality of second switching units SW2a, SW2a', . . . , SW2d, SW2d', a measuring unit 110, a residual capacity calculating unit 120, a determining unit 130 and a control unit 140.

The plurality of balancing resistors R1, . . . , R4 may be electrically connected to the plurality of battery modules M1, . . . , M4 included in the battery pack, respectively, through the plurality of first power paths L1a, . . . , L1d.

Namely, the plurality of balancing resistors R1, . . . , R4 may be controlled to the plurality of battery modules M1, . . . , M4 included in the battery pack in series, respectively, through the plurality of first power paths L1a, . . . , L1d.

The plurality of balancing resistors R1, . . . , R4 may be mounted to a substrate B where components of the battery management apparatus are mounted, and be installed to a battery pack. Accordingly, when power is supplied to the plurality of balancing resistors R1, . . . , R4, the resistance heat generated at the plurality of balancing resistors R1, ..., R4 may be conducted to the substrate B to overheat not only the substrate B but also the components of the battery management apparatus mounted at the substrate B.

Meanwhile, the plurality of first switching units SW1a, ..., SW1d may be individually provided at the plurality of first power paths L1a, ..., L1d to electrically connect or disconnect the plurality of balancing resistors R1, ..., R4 and the plurality of battery modules M1, ..., M4.

The fan F may be provided in plural, but in the present disclosure, an embodiment where only a single fan is used for balancing will be described.

The fan F may be electrically connected to the plurality of battery modules M1, ..., M4 included in the battery pack, respectively, through the plurality of second power paths L2a, L2a', ..., L2d, L2d'.

In other words, the fan F may be connected to the plurality of battery modules M1, ..., M4 included in the battery pack in parallel, respectively, through the plurality of second power paths L2a, L2a', ..., L2d, L2d'.

The fan F may be installed adjacent to the substrate B in order to cool the substrate B at which the components of the battery management apparatus as described above are mounted.

Meanwhile, the plurality of second switching units SW2a, SW2a', ..., SW2d, SW2d' may be individually provided at the plurality of second power paths L2a, L2a', ..., L2d, L2d' to electrically connect or disconnect the fan F and the plurality of battery modules M1, ..., M4.

The plurality of second power paths L2a, L2a', ..., L2d, L2d' may include positive electrode second power paths L2a, ..., L2d for electrically connecting positive electrode output terminals of the plurality of battery modules M1, ..., M4 and a positive electrode input terminal of the fan F and negative electrode second power paths L2a', ..., L2d' for electrically connecting negative electrode output terminals of the plurality of battery modules M1, ..., M4 and a negative electrode input terminal of the fan F.

At this time, the plurality of second switching units SW2a, SW2a', ..., SW2d, SW2d' may include positive electrode second switching units SW2a, ..., SW2d for electrically connecting or disconnecting the positive electrode second power paths L2a, ..., L2d and negative electrode second switching units SW2a', ..., SW2d' for electrically connecting or disconnecting the negative electrode second power paths L2a', ..., L2d'.

The measuring unit 110 may measure data used for the residual capacity calculating unit 120, explained later, to calculate a residual capacity of each of the plurality of battery modules M1, ..., M4.

For example, the measuring unit 110 may measure charge/discharge voltage, charge/discharge current and temperature of each of the plurality of battery modules M1, ..., M4.

In addition, the measuring unit 110 may measure a substrate temperature to determine whether the fan F is in operation or not.

The residual capacity calculating unit 120 may calculate a residual capacity of each of the plurality of battery modules M1, ..., M4. At this time, the residual capacity calculating unit 120 may use any method without limitation to calculate the residual capacity.

Here, the residual capacity may be a ratio calculated by comparing the power currently charged to each of the plurality of battery modules M1, ..., M4 with a maximum charging power.

The determining unit 130 may determine a battery module to be balanced among the plurality of battery modules M1, ..., M4 based on the residual capacity of each of the plurality of battery modules M1, ..., M4, calculated by the residual capacity calculating unit 120.

More specifically, the determining unit 130 may check whether a capacity deviation between the residual capacities of the plurality of battery modules M1, ..., M4 is equal to or greater than a preset first reference deviation and then determine that a battery module with the greatest residual capacity as the battery module to be balanced when the capacity deviation is equal to or greater than the preset first reference deviation as a result of the checking.

Here, the preset first reference deviation may be a reference value for determining whether or not to perform balancing.

Figure 2:
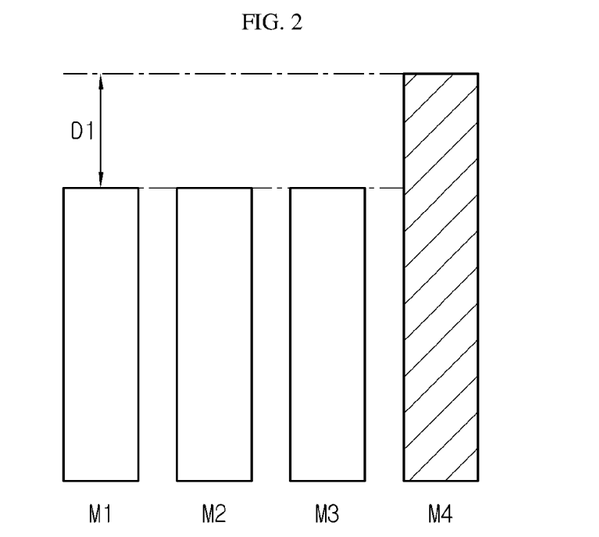
FIG. 2 is a graph showing residual capacities of a plurality of battery modules before the battery management apparatus according to an embodiment of the present disclosure performs balancing.

FIG. 2 is a graph showing residual capacities of the plurality of battery modules before the battery management apparatus according to an embodiment of the present disclosure performs balancing.

Referring to FIG. 2 further, when checking that the capacity deviation between the residual capacities of the plurality of battery modules M1, ..., M4 is equal to or greater than the preset first reference deviation "D1", the determining unit 130 may determine the battery module "M4" with the greatest residual capacity as the battery module to be balanced among the plurality of battery modules M1, ..., M4.

Here, the balancing may mean an operation of consuming and outputting the power of the battery module with the greatest residual capacity in order to reduce the deviation between the residual capacities of the plurality of battery modules. In other words, in the present disclosure, the balancing may mean passive balancing.

Meanwhile, when the battery module to be balanced is determined, the control unit 140 may control the plurality of first switching units SW1a, ..., SW1d so that the power of the battery module to be balanced is supplied to the balancing resistors R1, ..., R4.

More specifically, as shown in FIG. 2, when the battery module "M4" is determined as the battery module to be balanced, the control unit 140 may control the operation state of the first switching unit "SW1d" into an ON state to electrically connect the first power path "L1d" between the battery module "M4" and the balancing resistor "R4" so that the power of the battery module "M4" is supplied to the balancing resistor "R4" electrically connected to the battery module "M4".

On the contrary, the control unit 140 may control the operation states of the first switching units "SW1a" to "SW1c" into an OFF state to electrically disconnect the first power paths "L1a" to "L1c" respectively between the battery modules "M1" to "M3" and the balancing resistors "R1" to "R3" so that the power of the battery modules "M1" to "M3" not determined as the battery module to be balanced is not supplied to the balancing resistors "R1" to "R3", respectively.

After that, when the power of the battery module "M4" determined as the battery module to be balanced is supplied to the balancing resistor "R4" as described above, resistance heat is generated at the balancing resistor "R4", and thus the substrate B at which the components of the battery management apparatus are mounted may be overheated.

At this time, the measuring unit 110 may measure a substrate temperature of the overheated substrate B in real time and send the measured substrate temperature to the control unit 140.

When the battery module to be balanced is determined, the control unit 140 may monitor the received substrate temperature and control the plurality of second switching units SW2a, . . . , SW2d according to the substrate temperature so that the power of the battery module to be balanced is supplied to the fan F.

More specifically, as shown in FIG. 2, when the battery module "M4" is determined as the battery module to be balanced, the control unit 140 may monitor the received substrate temperature and check whether the substrate temperature is equal to or higher than a preset reference temperature.

When the substrate temperature is equal to or higher than the preset reference temperature as a result of the checking, the control unit 140 may control the plurality of second switching units SW2a, . . . , SW2d so that the power of battery module to be balanced is supplied to the fan F.

For example, when the temperature is equal to or higher than the preset reference temperature, the control unit 140 may control the operation state of the positive electrode second switching unit "SW2d" and the negative electrode second switching unit "SW2d'" into an ON state to electrically connect the positive electrode second power path "L2d" and the negative electrode second power path "L2d'" between the battery module "M4" and the fan F so that the power of the battery module "M4" determined as the battery module to be balanced is supplied to the fan F.

On the contrary, when the temperature is equal to or higher than the preset reference temperature, the control unit 140 may control the operation state of the positive electrode second switching units "SW2a" to "SW2c" and the negative electrode second switching units "SW2a'" to "SW2c'" into an OFF state to electrically disconnect the positive electrode second power paths "L2a" to "L2c" and the negative electrode second power paths "L2a'" to "L2c'" respectively between the battery modules "M1" to "M3" and the fan F so that the power of the battery modules "M1" to "M3" not determined as the battery module to be balanced is not supplied to the fan F.

According to the present disclosure, when the battery module to be balanced is determined according to a condition requiring balancing, the balancing is performed using the balancing resistors R1, . . . , R4 at an early stage, and when the substrate temperature is overheated, the balancing using the fan F may be further performed.

By doing so, since the overheated substrate B and the overheated components of the battery management apparatus mounted at the substrate B are cooled using the fan F by means of balancing using the balancing resistors R1, . . . , R4, the battery management apparatus may be protected against heat.

Figure 3:
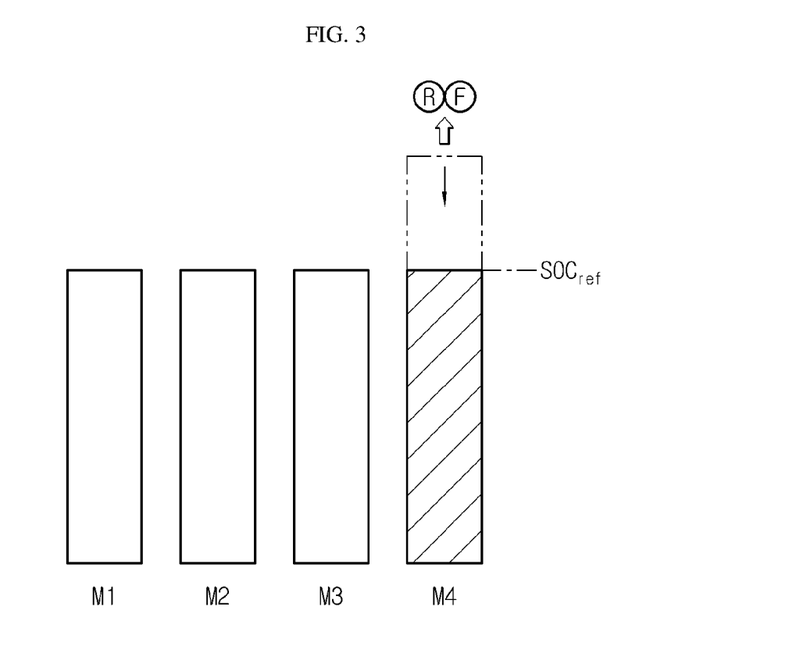
FIG. 3 is a graph showing residual capacities of the plurality of battery modules after the battery management apparatus according to an embodiment of the present disclosure performs balancing.

FIG. 3 is a graph showing residual capacities of the plurality of battery modules after the battery management apparatus according to an embodiment of the present disclosure performs balancing.

Referring to FIG. 3 further, when the residual capacity of the battery module to be balanced reaches a target capacity "SOCref", the control unit 140 may intercept the power of the battery module to be balanced.

More specifically, the control unit 140 may balance the battery module "M4" by supplying the power of the battery module "M4" determined as the battery module to be balanced to the balancing resistor "R4" and the fan F, and, when the residual capacity of the battery module "M4" reaches the target capacity "SOCref", control the operation state of the first switching unit "SW1d", the positive electrode second switching unit "SW2d" and the negative electrode second switching unit "SW2d'" into an OFF state to intercept the power of the battery module "M4".

By doing so, as shown in FIG. 3, the control unit 140 may perform balancing such that the battery modules "M1" to "M4" have uniform residual capacity. In addition, since the control unit 140 balances the battery module "M4" by supplying the power of the battery module "M4" determined as the battery module to be balanced to the fan F, it is possible to cool the heat generated by balancing using the balancing resistor and thus protect the components included in the battery management apparatus against overheating.

Figure 4:
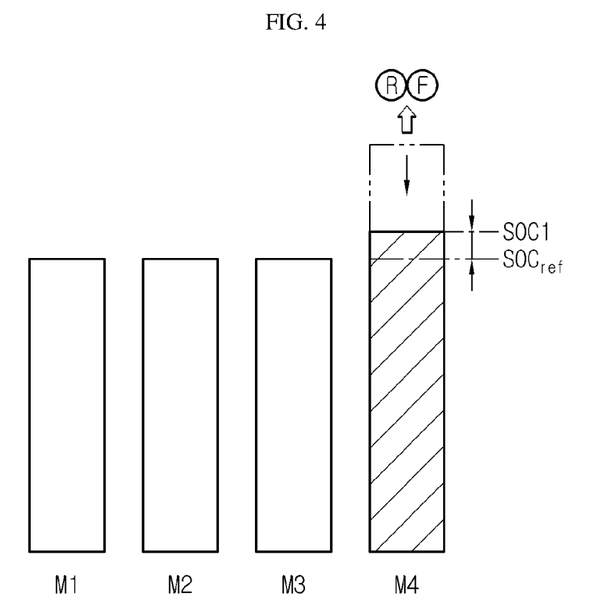
FIG. 4 is a graph showing residual capacities of the plurality of battery modules while the battery management apparatus according to another embodiment of the present disclosure is performing balancing.
Figure 5:
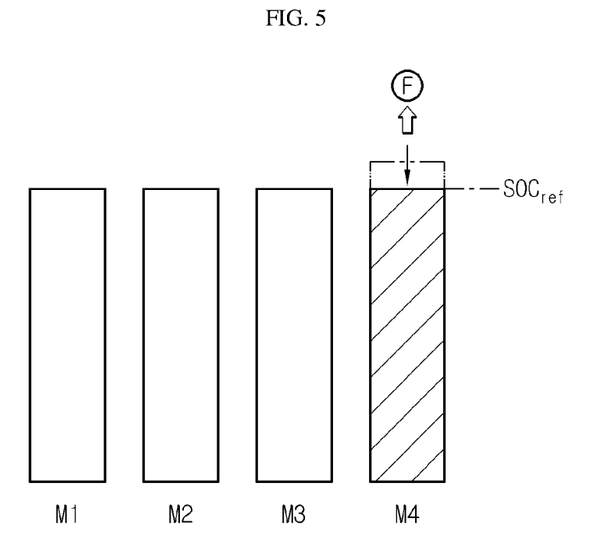
FIG. 5 is a graph showing residual capacities of the plurality of battery modules after the battery management apparatus according to another embodiment of the present disclosure performs balancing.

FIG. 4 is a graph showing residual capacities of the plurality of battery modules while the battery management apparatus according to another embodiment of the present disclosure is performing balancing, and FIG. 5 is a graph showing residual capacities of the plurality of battery modules after the battery management apparatus according to another embodiment of the present disclosure performs balancing.

Referring to FIGS. 4 and 5 further, a battery management apparatus according to another embodiment may be identical to the battery management apparatus of the former embodiment, except that the control unit 140 operates in a different way.

Accordingly, repeated explanation will be omitted.

In the battery management apparatus according to another embodiment, when the battery module to be balanced is determined, the control unit 140 supplies the power of the battery module to be balanced to the balancing resistors R1, . . . , R4 to perform balancing, and when the substrate temperature is equal to or higher than the preset reference temperature, the control unit 140 may perform balancing by supplying the power of the battery module to be balanced to the fan F along with the balancing using the balancing resistors R1, . . . , R4.

Moreover, in the battery management apparatus according to another embodiment, when the residual capacity of the battery module to be balanced is included in a preset capacity region based on the target capacity, the control unit 140 may control the plurality of first switching units SW1a, . . . , SW1d so that the power of the battery module to be balanced is not supplied to the balancing resistors R1, . . . , R4 and control the plurality of second switching units SW2a, SW2a', . . . , SW2d, SW2d' so that the power of the battery module to be balanced keeps supplied to the fan F.

More specifically, as shown in FIG. 4, the control unit 140 may control the operation state of only the first switching unit "SW1d", the positive electrode second switching unit "SW2d" and the negative electrode second switching unit "SW2d'" to an ON state to supply the power of the battery module "M4" to the balancing resistor "R4" and the fan F until the residual capacity of the battery module "M4" determined as the battery module to be balanced reaches the target capacity (SOCref).

After that, as shown in FIG. 5, when the residual capacity of the battery module "M4" determined as the battery module to be balanced is included in the preset capacity region (SOCref to SOC1) based on the target capacity (SOCref), the control unit 140 may control the operation state of the first switching unit "SW1d" to an OFF state and control the operation state of only the positive electrode second switching unit "SW2d" and the negative electrode second switching unit "SW2d'" to an ON state so that the power of the battery module "M4" is supplied only to the fan F.

By doing so, if the residual capacity of the battery module "M4" determined as the battery module to be balanced reaches the target capacity (SOCref), the balancing is performed using only the fan F, and thus the substrate B may be cooled effectively as being closer to the time when the balancing ends.

Figure 6:
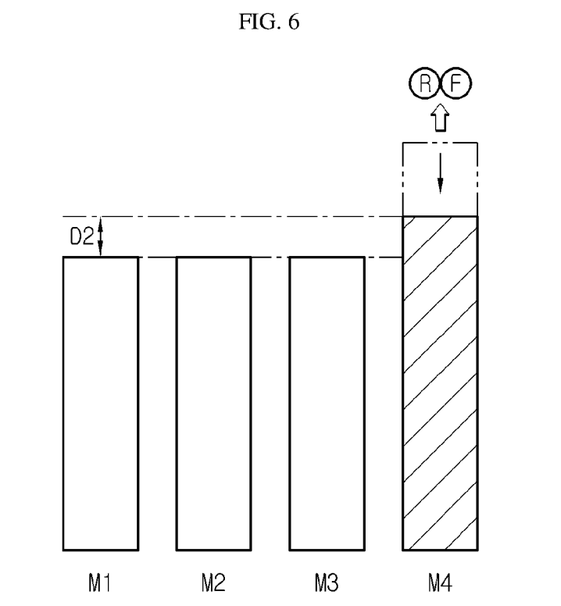
FIG. 6 is a graph showing residual capacities of the plurality of battery modules while the battery management apparatus according to still another embodiment of the present disclosure is performing balancing.
Figure 7:
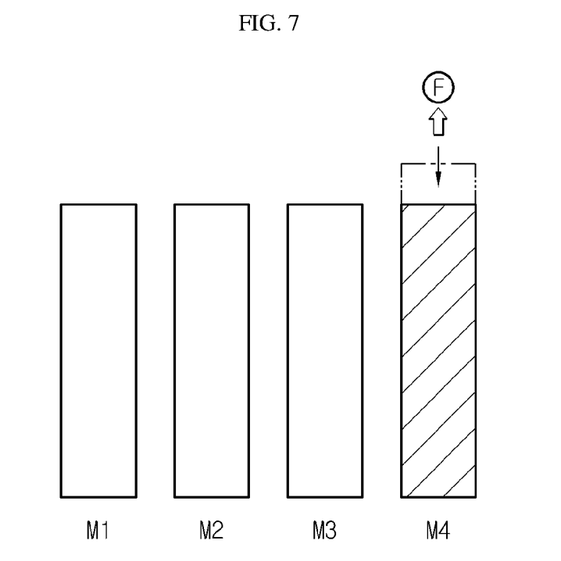
FIG. 7 is a graph showing residual capacities of the plurality of battery modules after the battery management apparatus according to still another embodiment of the present disclosure performs balancing.

FIG. 6 is a graph showing residual capacities of the plurality of battery modules while the battery management apparatus according to still another embodiment of the present disclosure is performing balancing, and FIG. 7 is a graph showing residual capacities of the plurality of battery modules after the battery management apparatus according to still another embodiment of the present disclosure performs balancing.

Referring to FIGS. 6 and 7 further, the battery management apparatus according to still another embodiment may be identical to the battery management apparatus of the former embodiment, except that the control unit 140 operates in a different way.

Accordingly, repeated explanation will be omitted.

In the battery management apparatus according to still another embodiment, when the battery module to be balanced is determined, the control unit 140 may supply the power of the battery module to be balanced to the balancing resistors R1, . . . , R4 to perform balancing, and when the substrate temperature is equal to or higher than the preset reference temperature, the control unit 140 may perform balancing by supplying the power of the battery module to be balanced to the fan F along with the balancing using the balancing resistors R1, . . . , R4.

Moreover, in the battery management apparatus according to still another embodiment, when the capacity deviation between the residual capacities of the plurality of battery modules M1, . . . , M4 is smaller than a preset second reference deviation D2, the control unit 140 may control the plurality of first switching units SW1a, . . . , SW1d so that the power of the battery module to be balanced is not supplied to the balancing resistors R1, . . . , R4 and control the plurality of second switching units SW2a, SW2a', . . . , SW2d, SW2d' so that the power of the battery module to be balanced keeps supplied to the fan F.

Here, the preset second reference deviation may have a value smaller than the preset first reference deviation.

More specifically, as shown in FIG. 6, the control unit 140 may control the operation state of only the first switching unit "SW1d", the positive electrode second switching unit "SW2d" and the negative electrode second switching unit "SW2d'" into an ON state so that the power of the battery module "M4" determined as the battery module to be balanced is supplied to the balancing resistor "R4" and the fan F until the capacity deviation between the residual capacities of the plurality of battery modules "M1" to "M4" reaches the preset second reference deviation "D2".

After that, as shown in FIG. 7, when the capacity deviation between the residual capacities of the plurality of battery modules "M1" to "M4" is smaller than the preset second reference deviation "D2", the control unit 140 may control the operation state of the first switching unit "SW1d" into an OFF state and control the operation state of only the positive electrode second switching unit "SW2d" and the negative electrode second switching unit "SW2d'" to an ON state so that the power of the battery module "M4" is supplied only to the fan F.

By doing so, if the capacity deviation between the residual capacities of the plurality of battery modules "M1" to "M4" is close to "0", the balancing is performed using only the fan F, and thus the substrate B may be cooled effectively as being closer to the time when the balancing ends.

Figure 8:
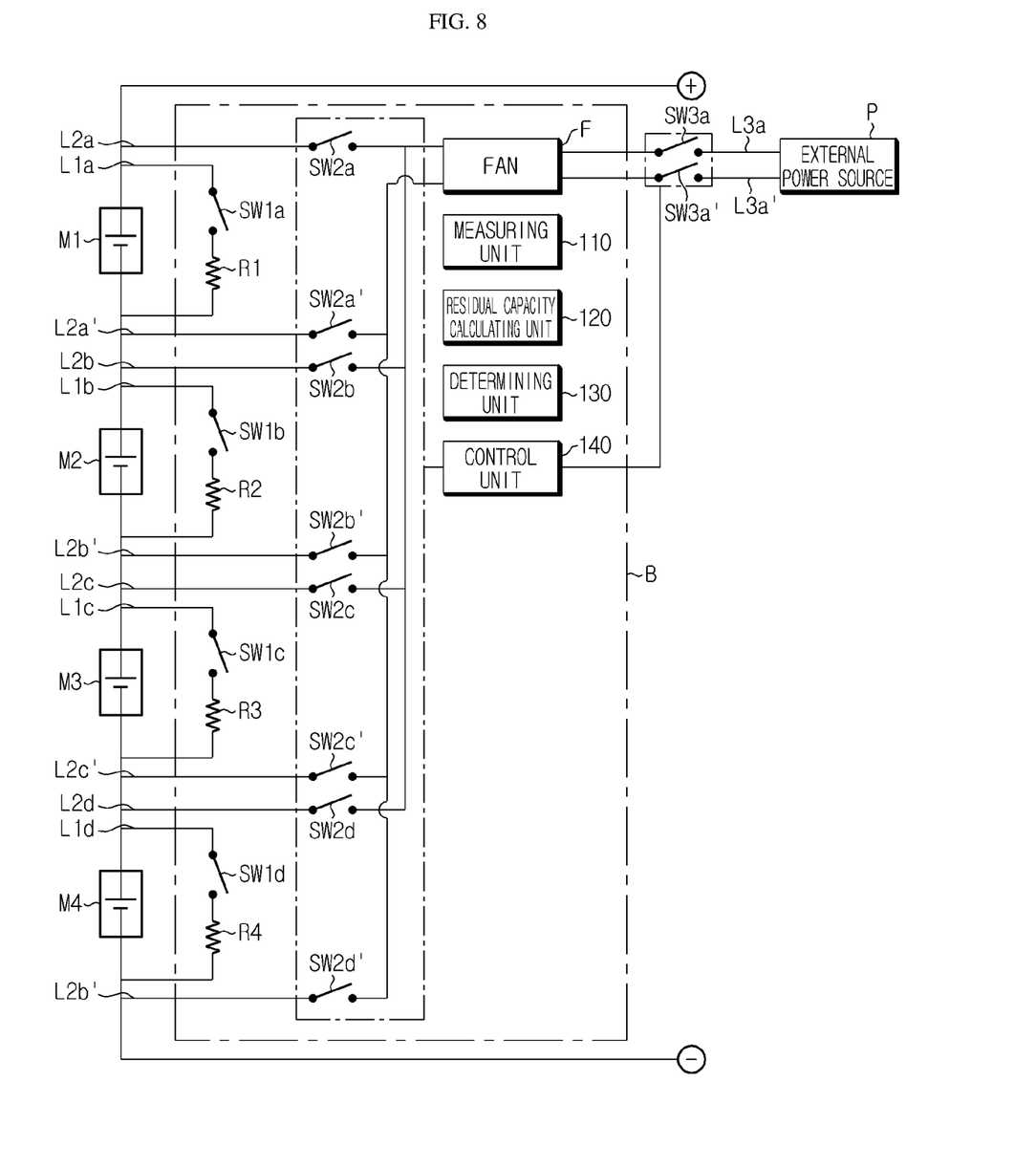
FIG. 8 is a circuit diagram schematically showing the battery management apparatus according to another embodiment of the present disclosure, and a configuration and circuit of a battery pack including the same.

FIG. 8 is a circuit diagram schematically showing the battery management apparatus according to another embodiment of the present disclosure, and a configuration and circuit of a battery pack including the same.

Referring to FIG. 8 further, the battery management apparatus according to another embodiment may be identical to the battery management apparatus of the former embodiment, except that the control unit 140 operates in a different way and a plurality of third power paths L3a, L3a' and a plurality of third switching units SW3a, SW3a' are further provided.

Accordingly, repeated explanation will be omitted.

An external power source P may be electrically connected to the fan F through the plurality of third power paths L3a, L3a'.

Meanwhile, the plurality of third switching units SW3a, SW3a' may be individually provided to the plurality of third power paths L3a, L3a', respectively, to electrically connect or disconnect the external power source P and the fan F.

Similar to the determining unit 130 of the former embodiment, the determining unit 130 according to another embodiment may determine the battery module to be balanced among the plurality of battery modules M1, . . . , M4, based on the residual capacity of each of the plurality of battery modules M1, . . . , M4, calculated by the residual capacity calculating unit 120.

More specifically, it is possible to check whether the capacity deviation between the residual capacities of the plurality of battery modules M1, . . . , M4 is equal to or greater than a preset first reference deviation, and then, when the capacity deviation is equal to or greater than the preset first reference deviation as a result of the checking, a battery module with the greatest residual capacity may be determined as the battery module to be balanced.

On the contrary, when the capacity deviation is smaller than the preset first reference deviation, it may not be determined as the battery module to be balanced.

When the battery module to be balanced is not determined, the control unit 140 may control the plurality of third switching units SW3a, SW3a' so that the power of the external power source P is supplied to the fan F.

At this time, when the battery module to be balanced is not determined, the control unit 140 may control the plurality of third switching units SW3a, SW3a' according to the substrate temperature of the substrate B so that the power of the external power source P is supplied to the fan F.

More specifically, when the battery module to be balanced is not determined, the control unit 140 may check whether the substrate temperature received from the measuring unit 110 is equal to or higher than the preset reference temperature.

After that, when the substrate temperature is equal to or higher than the preset reference temperature as a result of the checking, the control unit 140 may control the plurality of third switching units SW3a, SW3a' so that the power of the external power source P is supplied to the fan F.

Accordingly, in the present disclosure, even though the battery modules are not balanced, when the substrate temperature is equal to or higher than the preset reference temperature, it is possible to prevent the substrate B from being overheated by operating the fan F with the power of the external power source P.

Meanwhile, similar to the control unit 140 of the former embodiment, the control unit 140 according to another embodiment may control the plurality of first switching units SW1a, . . . , SW1d to supply the power of the battery module to be balanced to the balancing resistors R1, . . . , R4, when the battery module to be balanced is determined.

In addition, similar to the control unit 140 of the former embodiment, the control unit 140 according to another embodiment may control the plurality of second switching units SW2a, . . . , SW2d SW1d according to the substrate temperature so that the power of the battery module to be balanced is supplied to the fan F.

Here, repeated explanation will be omitted.

Meanwhile, the battery pack according to the present disclosure may further include a case for accommodating the battery module, a cartridge, a bus bar and the like, in addition to the plurality of battery modules. In particular, the battery pack according to the present disclosure may further include the battery management apparatus to balance residual capacities of a plurality of battery modules by using at least one of the balancing resistor and the fan.

The battery management apparatus according to the present disclosure may be applied to a vehicle such as an electric vehicle or a hybrid vehicle. In other words, the vehicle according to the present disclosure may include the battery management apparatus according to the present disclosure.

The present disclosure can be substituted, modified or changed in various ways without departing from the scope of the present disclosure by those skilled in the art and thus is not limited to the above embodiments and the accompanying drawings.

REFERENCE SIGNS

| | |
|---|---|
| 110: measuring unit | 120: residual capacity calculating unit |
| 130: determining unit | 140: control unit |

What is claimed is:

1. A battery management apparatus, comprising:
a plurality of first power paths, each first power path configured to electrically connect a corresponding one of a plurality of battery modules and a balancing resistor;
a plurality of first switching units, each first switching unit configured to electrically connect or disconnect a corresponding one of the plurality of first power paths;
a plurality of second power paths, each second power path configured to electrically connect a corresponding one of the plurality of battery modules to a fan for cooling a substrate at which the balancing resistor is mounted;
a plurality of second switching units, each second switching unit configured to electrically connect or disconnect a corresponding one of the plurality of second power paths;
a residual capacity calculating unit configured to calculate a residual capacity of each of the plurality of battery modules;
a determining unit configured to determine a battery module to be balanced among the plurality of battery modules based on the residual capacity; and
a control unit configured to:
control the plurality of first switching units so that a power of the battery module to be balanced is supplied to the balancing resistor via its respective first power path, when the battery module to be balanced is determined, and
control the plurality of second switching units so that the power of the battery module to be balanced is supplied to the fan via its respective second power path based on a substrate temperature of the substrate.

2. The battery management apparatus according to claim 1,
wherein the determining unit checks whether a capacity deviation between the residual capacities of the plurality of battery modules is equal to or greater than a preset first reference deviation, and determines a battery module with the greatest residual capacity as the battery module to be balanced when the capacity deviation is equal to or greater than the preset first reference deviation as a result of the checking.

3. The battery management apparatus according to claim 1,
wherein when the battery module to be balanced is determined, the control unit checks whether the substrate temperature is equal to or higher than a preset reference temperature, and controls the plurality of second switching units so that the power of the battery module to be balanced is supplied to the fan via its respective second power path when the substrate temperature is equal to or higher than the preset reference temperature as a result of the checking.

4. The battery management apparatus according to claim 1,
wherein when the residual capacity of the battery module to be balanced reaches a target capacity, the control unit interrupts the power of the battery module to be balanced.

5. The battery management apparatus according to claim 4,
wherein when the residual capacity of the battery module to be balanced is included in a preset capacity region based on the target capacity, the control unit controls the plurality of first switching units so that the power of the battery module to be balanced is not supplied to the balancing resistor via its respective first power path and controls the plurality of second switching units so that the power of the battery module to be balanced keeps supplied to the fan that cools the substrate via its respective second power path.

6. The battery management apparatus according to claim 4,
wherein when a capacity deviation between the residual capacities of the plurality of battery modules is smaller than a preset second reference deviation, the control unit controls the plurality of first switching units so that the power of the battery module to be balanced is not supplied to the balancing resistor via its respective first power path and controls the plurality of second switching units so that the power of the battery module to be balanced keeps supplied to the fan that cools the substrate via its respective second power path.

7. A battery management apparatus, comprising:
a plurality of first power paths, each first power path configured to electrically connect a corresponding one of a plurality of battery modules and a balancing resistor;
a plurality of first switching units, each first switching unit configured to electrically connect or disconnect a corresponding one of the plurality of first power paths;
a plurality of second power paths, each second power path configured to electrically connect a corresponding one of the plurality of battery modules to a fan for cooling a substrate at which the balancing resistor is mounted;
a plurality of second switching units, each second switching unit configured to electrically connect or disconnect a corresponding one of the plurality of second power paths;

a third power path configured to electrically connect the fan and an external power source;

a third switching unit configured to electrically connect or disconnect the third power path;

a residual capacity calculating unit configured to calculate a residual capacity of each of the plurality of battery modules;

a determining unit configured to determine a battery module to be balanced among the plurality of battery modules based on the residual capacity; and a control unit configured to control the third switching unit so that a power of the external power source is supplied to the fan via the third power path when the battery module to be balanced is not determined, and control the plurality of first switching units so that the power of the battery module to be balanced is supplied to the balancing resistor via its respective first power path when the battery module to be balanced is determined, wherein the control unit controls the plurality of second switching units so that the power of the battery module to be balanced is supplied to the fan via its respective second power path based on a substrate temperature of the substrate.

8. A battery pack comprising a battery management apparatus according to claim 1.

9. A vehicle comprising a battery management apparatus according to claim 1.

10. The battery management apparatus according to claim 1, wherein the balancing resistor comprises a plurality of balancing resistor portions, wherein each respective first power path is configured to electrically connect one of the plurality of battery modules to a corresponding one of the plurality of balancing resistor portions.

* * * * *